(No Model.)
A. MORRIS.
FISH DRYING APPARATUS.
No. 591,986. Patented Oct. 19, 1897.
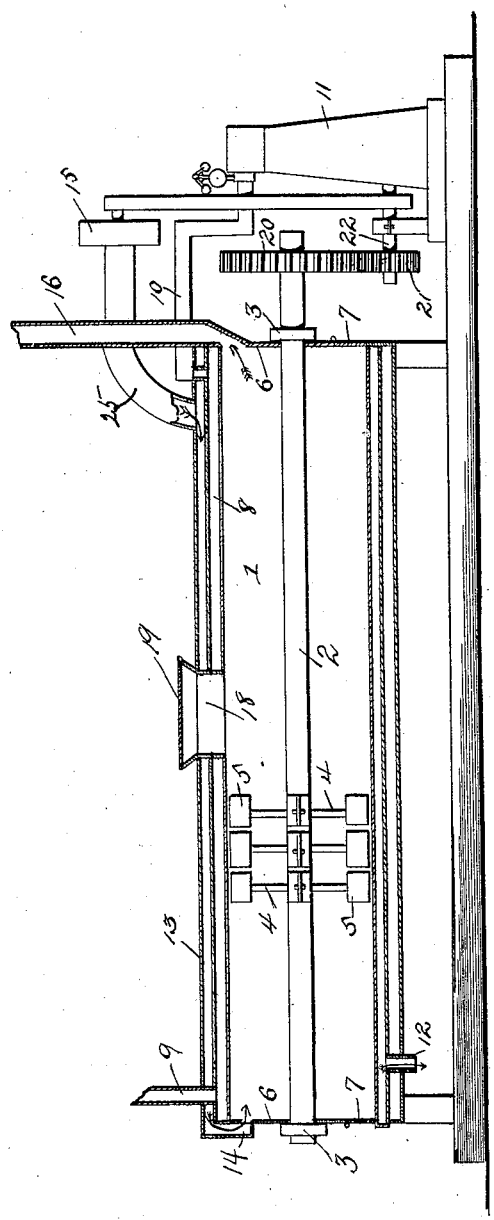
WITNESSES
W. E. Aughinbaugh
R. M. Elliott
INVENTOR
Albert Morris,
by J. Krebs Rusk, Jr.,
his Attorney

UNITED STATES PATENT OFFICE.

ALBERT MORRIS, OF FAIR PORT, VIRGINIA.

FISH-DRYING APPARATUS.

SPECIFICATION forming part of Letters Patent No. 591,986, dated October 19, 1897.

Application filed September 14, 1895. Serial No. 562,556. (No model.)

*To all whom it may concern:*

Be it known that I, ALBERT MORRIS, a citizen of the United States, and a resident of Fair Port, in the county of Northumberland and State of Virginia, have invented a certain new and useful Improvement in an Apparatus for Cooking and Drying Fish for Fertilizer, of which the following is a description.

My invention has relation to an apparatus for cooking and drying fish or other material for fertilizing purposes.

In the drawing a sectional view of my device is shown.

Referring to the accompanying illustration, 1 indicates a chamber cylindrical in form, through the center of which a shaft 2 runs, said shaft being secured in bearings 3 3. Attached to the shaft 2 by any suitable means are a number of stirrer-arms 4 4 4, provided with blades 5 5 at their extremities for the purpose of breaking up and mixing the material to be operated upon. The cylindrical chamber is closed at both ends with fixed heads 6, said heads having secured to them the bearings 3 3, in which the shaft revolves. The heads 6 are also provided with doors 7 for the purpose of cleaning the chamber and for removing the material after it has been operated upon. Surrounding the cylindrical chamber 1 is a steam-jacket 8, having an inlet-pipe 9, through which steam may be admitted from a boiler. (Not shown.) In order to accomplish the purposes of my invention, the steam in the steam-jacket 8, surrounding the chamber 1, must be kept under pressure, and after it has been used to warm the chamber and the incoming air is still in condition for further use, and passes out through a pipe 10 to the steam-chest of an engine 11, where it is again utilized for the purpose of operating the stirrer-arms. The steam-jacket 8 is provided with a drip-pipe 12 for carrying off condensed moisture. Incasing the steam-jacket is a casing 13, being connected with the interior of the chamber 1 by means of an opening 14, through which air is driven to the chamber 1 by means of a blower 15 and a pipe 25, the said blower being operated by the engine 11, said air before entering the chamber having been heated by its contact with the lining of the steam-jacket.

16 indicates a vent-pipe through which the air which has been driven into the chamber by the blower, as well as the moisture from the material in the chamber, may be carried off. The material to be converted into fertilizer is fed to the chamber by means of a hopper 18, provided with a lid 19.

Secured to the end of the shaft 2 is a large gear-wheel 20, which meshes with a spur-wheel 21 on the end of a shaft 22. Motion is imparted to the above arm 2 by means of the engine and the intermediate mechanism, as is apparent.

It will be observed that fertilizer made from fish in this manner still retains the greater portion of its valuable chemical properties, inasmuch as the steam is not brought in direct contact with the material to be cooked, and therefore cannot carry off the chemicals which it otherwise would volatilize by its action. In addition to this one supply of steam is made to desiccate the material in the chamber, and at the same time operate the device.

By using my apparatus in drying fish for fertilizing purposes at least twenty-five per cent. more ammonia is retained in the fertilizer than by other processes, while at the same time the cost of manufacture is decreased and the labor is lessened.

Having thus described my invention, what I claim, and desire to secure by Letters Patent, is—

1. In an apparatus for the manufacture of fertilizer, the combination of a casing forming a treating-chamber, an eduction-pipe leading from said chamber, a steam-jacket surrounding said casing, means for supplying said jacket with steam, a casing inclosing said jacket and forming an air-chamber between said jacket and said casing, means for introducing air under pressure into the chamber formed by said casing and said jacket, and means for connecting said air-chamber with said treating-chamber to allow the passage of air from one to the other.

2. An apparatus for the manufacture of fertilizers comprising a closed chamber provided with vapor-exit located at one end thereof, stirrers mounted on a shaft working in bearings secured at the end of said chamber, a steam-jacket surrounding said chamber connected with a source for supplying live steam thereto, means for carrying the live steam after its contact with the chamber to the steam-chest of an engine, a drip-pipe located at the lower end of the steam-jacket, a casing surrounding the steam-jacket, a blower adapted to drive air through said casing into the chamber, said blower and the stirrers in said chamber adapted to be revolved by an engine driven by the excess of steam from the steam-jacket.

In testimony whereof I hereunto affix my signature in the presence of two witnesses.

ALBERT MORRIS.

Witnesses:
H. W. RUSK,
THOS. P. McCULLOUGH.